(12) United States Patent
Yeh et al.

(10) Patent No.: US 10,900,516 B2
(45) Date of Patent: Jan. 26, 2021

(54) MOTOR HAVING SHOCK-PROOF DESIGN

(71) Applicant: Delta Electronics, Inc., Taoyuan (TW)

(72) Inventors: Cheng-Hsien Yeh, Taoyuan (TW); Chih-Wei Chan, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 16/369,470

(22) Filed: Mar. 29, 2019

(65) Prior Publication Data

US 2019/0226523 A1 Jul. 25, 2019

Related U.S. Application Data

(62) Division of application No. 15/439,164, filed on Feb. 22, 2017, now Pat. No. 10,280,975.

(30) Foreign Application Priority Data

Nov. 4, 2016 (CN) .......................... 2016 1 0973281

(51) Int. Cl.
*F16C 17/10* (2006.01)
*F16C 27/02* (2006.01)
(Continued)

(52) U.S. Cl.
CPC ............ *F16C 27/02* (2013.01); *F01D 25/183* (2013.01); *F04D 25/062* (2013.01);
(Continued)

(58) Field of Classification Search
CPC ...... F16C 17/105; F16C 17/107; F16C 27/02; F16C 32/0633; F16C 33/0651;
(Continued)

(56) References Cited

U.S. PATENT DOCUMENTS 4,484,321 A 11/1984 Eisemann
6,339,273 B1 1/2002 Higuchi
(Continued)

FOREIGN PATENT DOCUMENTS

CN 1436284 A 8/2003
CN 1447035 A 10/2003
(Continued)

OTHER PUBLICATIONS

Office Action dated Apr. 2, 2019 in Chinese Application No. CN201610973281.8.

(Continued)

*Primary Examiner* — Marcus Charles
(74) *Attorney, Agent, or Firm* — Muncy, Geissler, Olds & Lowe, P.C.

(57) ABSTRACT

A motor includes a shaft, a shell, a sleeve, an abrasion-resistance piece, a bearing, an oil seal, and several compressed springs. The shaft has an axial line. The shell is connected to the shaft. The sleeve has an accommodating space, and the wall of the accommodating space forms a first inclined surface which is inclined at an angle with respect to the axial line. The abrasion-resistance piece is disposed at the bottom of the accommodating space. The bearing is disposed in the accommodating space, and the outer wall of the bearing forms a second inclined surface corresponding to the first inclined surface. The shaft passes through the bearing and abuts the abrasion-resistance piece. The oil seal is affixed to the wall of the accommodating space and covers the bearing. The compressed springs are connected between the oil seal and the bearing.

20 Claims, 12 Drawing Sheets

(51) Int. Cl.
    *F16C 32/06* (2006.01)
    *F04D 25/06* (2006.01)
    *F04D 29/05* (2006.01)
    *H02K 1/17* (2006.01)
    *H02K 1/27* (2006.01)
    *F01D 25/18* (2006.01)
    *H02K 5/167* (2006.01)
    *F04D 29/02* (2006.01)
    *F04D 29/051* (2006.01)
    *F04D 29/053* (2006.01)
    *F04D 29/056* (2006.01)
    *F04D 29/057* (2006.01)

(52) U.S. Cl.
    CPC ....... *F04D 25/0626* (2013.01); *F04D 29/023* (2013.01); *F04D 29/053* (2013.01); *F04D 29/057* (2013.01); *F04D 29/0513* (2013.01); *F04D 29/0566* (2013.01); *F16C 17/105* (2013.01); *F16C 17/107* (2013.01); *F16C 32/0651* (2013.01); *H02K 1/17* (2013.01); *H02K 1/27* (2013.01); *H02K 5/1675* (2013.01); *F16C 32/0633* (2013.01); *F16C 2360/46* (2013.01); *F16C 2380/26* (2013.01)

(58) Field of Classification Search
    CPC ............. F16C 32/0696; F16C 2360/46; F16C 2389/26; F01D 25/183; F04D 25/062; F04D 25/0626; F04D 29/023; F04D 29/0513; F04D 29/053; F04D 29/0566; F04D 29/057; H02K 1/17; H02K 1/27; H02K 5/1675; H02K 7/085
    USPC ........ 384/100, 103, 112–114, 121, 123, 279, 384/902; 310/67 R, 90; 284/119, 124
    See application file for complete search history.

(56) References Cited

U.S. PATENT DOCUMENTS

| | | | |
|---|---|---|---|
| 6,502,990 B2 * | 1/2003 | Narita | F16C 43/02 384/100 |
| 6,661,131 B2 * | 12/2003 | Fukutani | H02K 1/28 310/154.01 |
| 6,713,907 B2 | 3/2004 | Matsumoto | |
| 7,439,643 B2 * | 10/2008 | Nagai | H02K 7/09 310/156.04 |
| 7,622,838 B2 | 11/2009 | Watanabe et al. | |
| 7,979,874 B2 | 7/2011 | Park et al. | |
| 8,037,490 B2 | 10/2011 | Park | |
| 8,370,868 B2 | 2/2013 | Smirnov et al. | |
| 8,407,731 B2 | 3/2013 | Ito et al. | |
| 8,468,554 B2 | 6/2013 | Yamane et al. | |
| 8,561,091 B2 | 10/2013 | Ryu | |
| 8,890,382 B2 * | 11/2014 | Kojima | F04D 17/16 310/51 |
| 9,087,544 B2 | 7/2015 | Ito et al. | |
| 9,500,227 B2 * | 11/2016 | Chen | F04D 29/0513 |
| 2001/0038250 A1 | 11/2001 | Katagiri et al. | |
| 2005/0094908 A1 * | 5/2005 | Kim | F16C 17/045 384/107 |
| 2005/0100256 A1 * | 5/2005 | Nagarathnam | F16C 17/107 384/107 |
| 2006/0267435 A1 | 11/2006 | Lin et al. | |
| 2007/0294712 A1 | 12/2007 | Ito et al. | |
| 2008/0046906 A1 * | 2/2008 | Takaki | G11B 17/0282 720/707 |
| 2010/0084930 A1 | 4/2010 | Kim | |
| 2010/0146525 A1 | 6/2010 | Kim et al. | |
| 2014/0160593 A1 | 6/2014 | Smirnov | |
| 2014/0369630 A1 | 12/2014 | Leuthold et al. | |

FOREIGN PATENT DOCUMENTS

| | | |
|---|---|---|
| CN | 1896547 A | 1/2007 |
| CN | 201116527 Y | 9/2008 |
| CN | 102016992 A | 4/2011 |
| CN | 102948043 A | 2/2013 |
| CN | 103166379 A | 6/2013 |
| CN | 203009871 U | 6/2013 |
| CN | 103470617 A | 12/2013 |
| CN | 203743028 U | 7/2014 |
| CN | 104638816 A | 5/2015 |
| GB | 900602 A | 7/1962 |

OTHER PUBLICATIONS

Office Action dated Mar. 4, 2020 in Chinese Application No. CN201910499053.5.
Search Report dated Mar. 15, 2020 in Chinese Application No. 2019104990569.

* cited by examiner

MOTOR HAVING SHOCK-PROOF DESIGN

CROSS REFERENCE TO RELATED APPLICATIONS

The present application is a divisional application of the U.S. patent application Ser. No. 15/439,164 filed on Feb. 22, 2017 (now U.S. Pat. No. 10,280,975 B2), which claims priority of China Patent Application No. 201610973281.8, filed on Nov. 4, 2016, the entirety of which is incorporated by reference herein.

BACKGROUND OF THE INVENTION

Field of the Invention

The invention relates to a motor, and in particular to a motor with shock-proof design.

Description of the Related Art

In general, environments in which a fan is used are usually not ideal. When a fan is shaken, vibrated, or turned upside-down during operation, the shaft of the (fan) motor is likely to be tilted, resulting in the shaft and the bearing coming into contact with each other and causing wear and tear. As a result, the stable operation and the life of the fan may be affected.

Moreover, in a traditional motor, the head of the shaft abuts against an abrasion-resistance piece that is affixed directly to the bottom of the internal space of the sleeve. As such, when the motor is subjected to shock or impact, the force of the impact along the axial direction of the shaft will focus on the abrasion-resistance piece. Thus, the abrasion-resistance piece or the connected sleeve can easily become damaged or deformed so that the stable operation and the life of the fan are also affected.

SUMMARY OF THE INVENTION

In view of the aforementioned problems, an object of the invention is to provide a motor with shock-proof design which can effectively absorb the shock or impact energy so as to reduce the chances of damage occurring to the shaft, bearing, abrasion-resistance piece, and other components in the motor, thereby maintaining the stable operation and the life of the motor and the fan.

An embodiment of the invention provides a motor, including a shaft, a rotor shell, a sleeve, an abrasion-resistance piece, a bearing, an oil seal, and several compressed springs. The shaft has an axial line. The rotor shell is connected to the shaft. The sleeve has an accommodating space, and the wall of the accommodating space forms a first inclined surface which is inclined at an angle with respect to the axial line. The abrasion-resistance piece is disposed at the bottom of the accommodating space. The bearing is disposed in the accommodating space, and the outer wall of the bearing forms a second inclined surface corresponding to the first inclined surface. The shaft passes through the bearing and abuts the abrasion-resistance piece. The oil seal is affixed to the wall of the accommodating space and covers the bearing. The compressed springs are connected between the oil seal and the bearing.

In some embodiments, when the bearing and the shaft are subjected to an external force along a first direction to move parallel to the axial line of the shaft so that the shaft is separated from the abrasion-resistance piece, the compressed springs are deformed by force and exert an elastic restoring force along a second direction on the bearing to return the bearing and the shaft back to their original positions, wherein the second direction is opposite to the first direction.

In some embodiments, when the bearing and the shaft are subjected to another external force along a third direction so that the second inclined surface of the bearing slides with respect to the first inclined surface of the accommodating space and so that the shaft is separated from the abrasion-resistance piece, the compressed springs are deformed by force and exert an elastic restoring force on the bearing to return the bearing and the shaft back to their original positions, wherein the third direction is different from the first and second directions.

In some embodiments, a first limiting structure is provided on the first inclined surface of the accommodating space, and a second limiting structure is provided on the second inclined surface of the bearing, wherein the position and shape of the second limiting structure correspond to those of the first limiting structure so that the maximum sliding distance between the first inclined surface and the second inclined surface is limited by the first and second limiting structures.

In some embodiments, the motor further includes a retainer ring connected to the shaft and situated between the bottom of the accommodating space and the bearing for preventing the shaft from being separated from the bearing.

Another embodiment of the invention provides a motor, including a shaft, a rotor shell, a sleeve, an elastic member, an abrasion-resistance piece, a bearing, and a thrust plate. The rotor shell is connected to the shaft. The sleeve has an accommodating space. The elastic member is disposed at the bottom of the accommodating space. The abrasion-resistance piece is disposed on the elastic member and situated between the elastic member and the head of the shaft. The bearing is disposed in the accommodating space. The shaft passes through the bearing and abuts the abrasion-resistance piece. The thrust plate is connected to the shaft. When the shaft is subjected to an external force along a first direction to move and push the abrasion-resistance piece, the elastic member is deformed by force and exerts an elastic restoring force along a second direction on the shaft, and a face auxiliary force is generated between the thrust plate and the bearing to assist the elastic restoring force, to return the shaft back to its original position, wherein the second direction is opposite to the first direction.

In some embodiments, the thrust plate is provided on an end portion of the shaft adjacent to the rotor shell, and several grooves that are width-reduced from the outward to the center are formed on a surface of the thrust plate facing the bearing.

In some embodiments, the face auxiliary force generated between the thrust plate and the bearing is in the same direction as the elastic restoring force of the elastic member, and the magnitude of the face auxiliary force is inversely proportional to the size of the gap between the thrust plate and the bearing.

In some embodiments, the thrust plate is provided on an end portion of the shaft adjacent to the elastic member, and several grooves that are width-reduced from the outward to the center are formed on a surface of the thrust plate facing the bearing.

In some embodiments, the face auxiliary force generated between the thrust plate and the bearing is in the reverse direction with respect to the elastic restoring force of the elastic member, and the magnitude of the face auxiliary force is inversely proportional to the size of the gap between the thrust plate and the bearing.

In some embodiments, the face auxiliary force generated between the thrust plate and the bearing is also used to prevent the shaft from moving obliquely.

In some embodiments, the elastic member has a disk part, several outer ring parts surrounding the disk part, and several connecting parts connecting the disk part and the outer ring parts. The abrasion-resistance piece is received in the disk part.

In some embodiments, the bottom of the accommodating space forms a recess and a protrusion surrounding the recess. The disk part is placed in the recess and separated from the bottom surface of the recess by a distance, and the outer ring parts are affixed to the protrusion.

In some embodiments, the motor further includes a spacer between the outer ring parts on the protrusion and the bearing.

In some embodiments, the bottom of the accommodating space forms a recess. The elastic member is placed in the recess, and the disk part is separated from the bottom surface of the recess by a distance.

In some embodiments, the motor further includes a pressure ring for securing the elastic member in the recess.

In some embodiments, the rotor shell has a plurality of protruding structures extending from the rotor shell toward the direction of the sleeve. The protruding structures and the top of the sleeve form a comb structure so as to prevent the lubricating oil stored in the accommodating space of the sleeve from leaking.

In some embodiments, at least one exhaust channel is formed on the sleeve.

In some embodiments, the sleeve is an oil-retaining bearing, a hydrodynamic bearing, or a ceramic bearing.

In some embodiments, the motor further includes a base body, wherein the base body and the sleeve are formed integrally as one piece or are two members that can be separated from each other.

In order to illustrate the purposes, features, and advantages of the invention, the preferred embodiments and drawings of the invention are shown in detail as follows.

BRIEF DESCRIPTION OF THE DRAWINGS

The invention can be more fully understood by reading the subsequent detailed description and examples with references made to the accompanying drawings, wherein.

DESCRIPTION OF THE INVENTION

Figure 1:
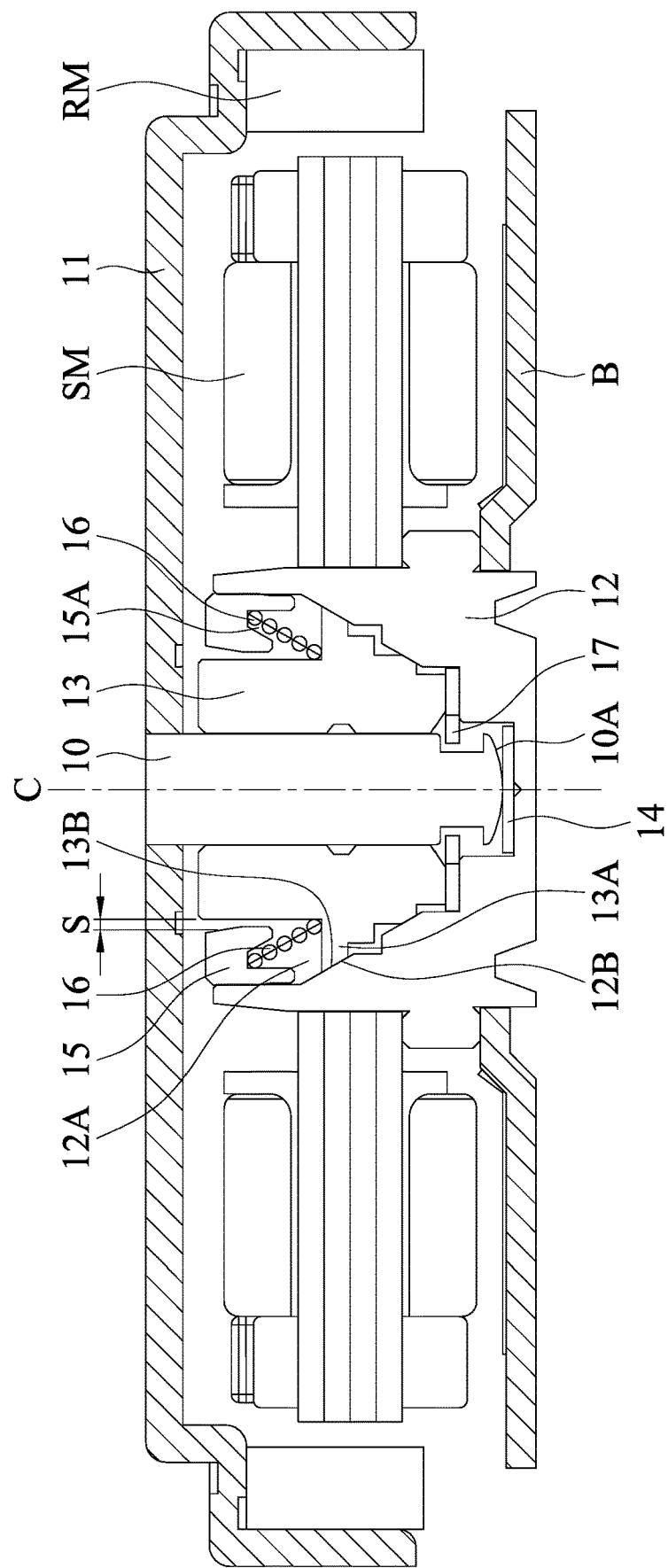
FIG. 1 is a schematic cross-sectional view of a motor in accordance with a first embodiment of the invention.

A detailed description is given in the following embodiments with reference to the accompanying drawings. Note that the present disclosure may repeat reference numerals and/or letters in the various examples. This repetition is for the purpose of simplicity and clarity and does not in itself dictate a relationship between the various embodiments and/or configurations discussed. Various features may be arbitrarily drawn in different scales for the sake of simplicity and clarity.

In addition, since the basic structure of the motor is well known in the art of the present invention, only the cross-sectional views of the embodiments are schematically shown in the following drawings, and the structural features of important components of the embodiments are further illustrated in the following paragraphs.

First Embodiment

Referring to FIG. 1, a motor 1 in accordance with a first embodiment of the invention includes a shaft 10, a rotor shell 11, a sleeve 12, a bearing 13, an abrasion-resistance piece 14, an oil seal 15, and several (spiral) compressed springs 16. It should be understood first that the shaft 10 and rotor shell 11 belong to a rotor structure, and the sleeve 12, bearing 13, abrasion-resistance piece 14, oil seal 15, and compressed springs 16 belong to a stator structure. The motor 1 also includes a base body B for supporting the stator structure described above, wherein the base body B and the sleeve 12 may be formed integrally as one piece or be two members that can be separated from each other.

The head 10A of the shaft 10 may be spherical or curved so as to enhance the performance and the life of the motor.

The rotor shell 11 is connected to the shaft 10. In this embodiment, the rotor shell 11 and the shaft 10 can be connected by welding (e.g. laser welding), but the invention is not limited thereto. In some embodiments, the rotor shell 11 and the shaft 10 may also be connected by screw locking, interference fitting, or integrally forming. Moreover, several rotor magnets RM are mounted on the rotor shell 11 and correspond to the stator magnets SM on the base body B. It should be noted that one or more blades (not shown) may also be mounted on the rotor shell 11 so that the motor 1 can be used as a fan. The arrangement of the blades is a well-known art in this field and thus is not described here.

The sleeve 12 has an accommodating space 12A with the bearing 13 disposed therein, and the shaft 10 passes through the bearing 13. The accommodating space 12A may be filled with lubricating oil to assist the shaft 10 in rotation. The abrasion-resistance piece 14 is disposed at the bottom of the accommodating space 12A so that the head 10A of the shaft 10 can be rotated against the abrasion-resistance piece 14 and is not easy to wear. Thus, the life of the shaft 10 can be prolonged, thereby maintaining the performance and the life of the motor and the fan.

In this embodiment, the bottom portion and the ring portion of the sleeve 12 are integrally formed, but the invention is not limited thereto. In some embodiments (e.g. the motor of another embodiment shown in FIG. 10), the bottom portion of the sleeve may also be designed as a separable bottom cover.

In this embodiment, the bearing 13 may be an oil-retaining bearing, a hydrodynamic bearing, or a ceramic bearing, and some hydrodynamic trench lines (not shown) are formed on the inner surface of the bearing 13 corresponding to the shaft 10 so as to hold the shaft 10 without contacting the inner surface of the bearing 13 (i.e. the bearing 13 provides the shaft 10 with a radial retention force) due to the hydrodynamic pressure generated by the lubricating oil. As a result, the life of the shaft 10 and the bearing 13 can be prolonged, thereby maintaining the performance and the life of the motor and the fan. Furthermore, the hydrodynamic trench lines may be changed in accordance with the forward and reverse directions of the motor 1 and are thus not limited here. The design of the hydrodynamic trench lines is a well-known art in this field and thus is not described here.

As shown in FIG. 1, in this embodiment, the bearing 13 is formed with a shoulder portion 13A protruding toward the wall of the accommodating space 12A of the sleeve 12, and the outer wall of the shoulder portion 13A forms an inclined surface (second inclined surface 13B). Note that the shoulder portion 13A is preferably formed to surround the bearing 13. Moreover, the wall of the accommodating space 12A of the sleeve 12 forms an inclined surface (first inclined surface 12B) corresponding to the second inclined surface 13B of the shoulder portion 13A, wherein the first and second inclined surfaces 12B and 13B are respectively inclined at an (acute) angle between 30 degrees and 45 degrees with respect to the axial line C of the shaft 10.

The oil seal 15 is affixed to the wall of the accommodating space 12A of the sleeve 12 and covers the bearing 13. In this embodiment, the oil seal 15 is an annular structure, and its outer surface is connected to the wall of the accommodating space 12A of the sleeve 12 by interference fitting so that the oil seal 15 can be affixed to the top of the accommodating space 12A. Moreover, an appropriate gap S may be provided between the inner surface of the oil seal 15 and the upper end portion of the bearing 13 to allow the bearing 13 to move (as will be described later) and to prevent the lubricating oil stored in the accommodating space 12A from leaking, thereby maintaining the performance and the life of the motor and the fan.

The compressed springs 16 are connected between the oil seal 15 and the bearing 13. More specifically, in this embodiment, the lower side of oil seal 15 forms an annular recess 15A, and the compressed springs 16 are arranged separately along the annular recess 15A, wherein the number of compressed springs 16 can be changed according to need. Moreover, one end of each compressed spring 16 is secured in the annular recess 15A, and the other end is secured on the shoulder portion 13A of the bearing 13. For example, in this embodiment, after the bearing 13 is placed in the accommodating space 12A of the sleeve 12 and the second inclined surface 13B of the bearing 13 contacts the first inclined surface 12B of the accommodating space 12A (as shown in FIG. 1), the compressed springs 16 can be placed on the shoulder portion 13A of the bearing 13 first. Then, the compressed springs 16 can be introduced into the annular recess 15A of the oil seal 15, after the oil seal 15 is affixed to the wall of the accommodating space 12A, so as to complete securing the compressed springs 16.

In this embodiment, the motor 1 also includes a retainer ring 17. The retainer ring 17 is connected to the shaft 10 (the shaft 10 will pass through it) and situated between the bottom of the accommodating space 12A of the sleeve 12 and the bearing 13 for preventing the shaft 10 from being separated from the bearing 13 too easily. The design of the retainer ring 17 is a well-known art in this field and thus is not described here.

With the above structural design, when the motor 1 is not subjected to shock or impact, the bearing 13 can be secured on the first inclined surface 12B (also called the limiting surface) of the accommodating space 12A of the sleeve 12 by the compressed springs 16, and the shaft 10 can rotate stably.

Figure 2:
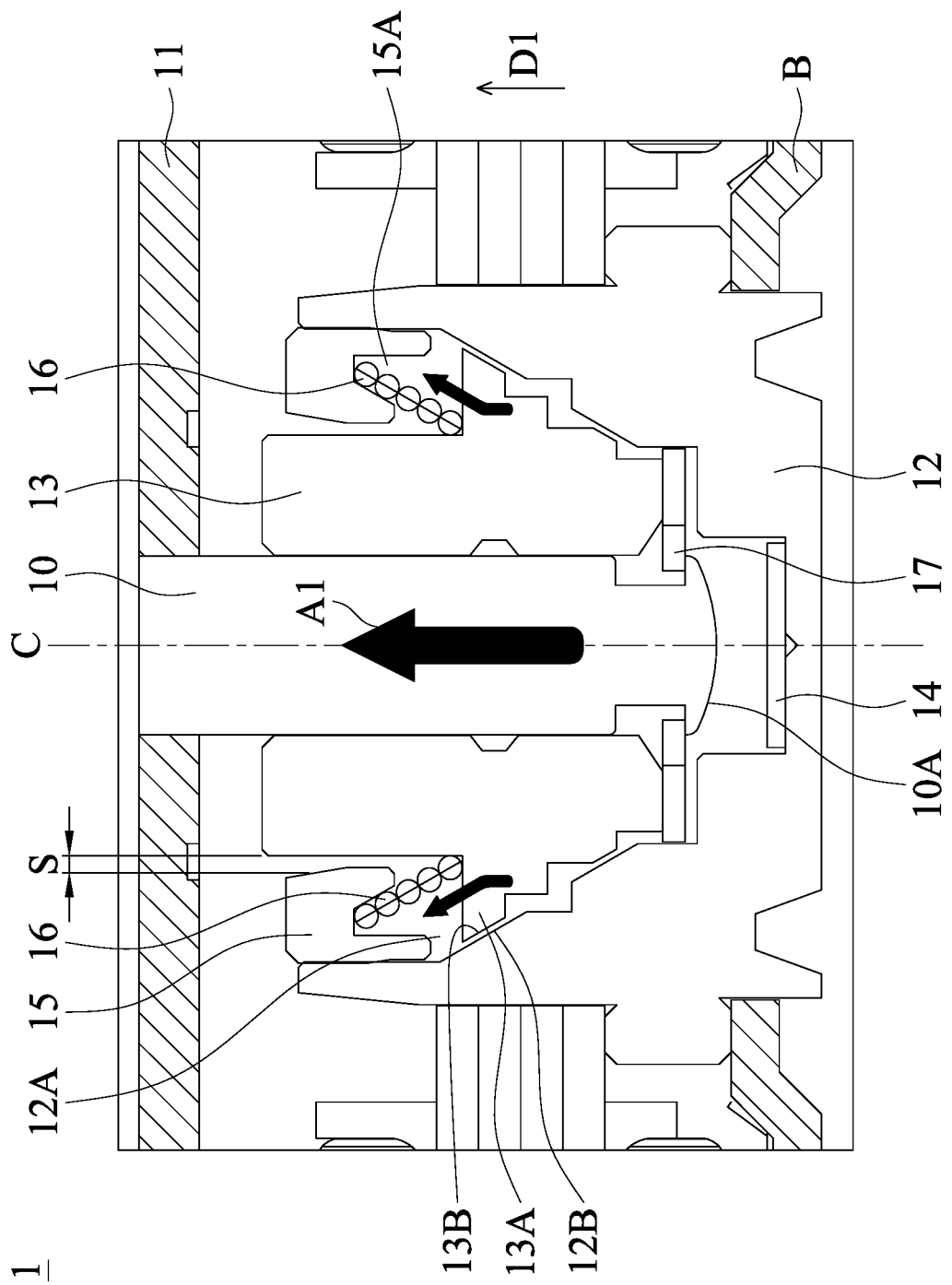
FIG. 2 is a schematic partial enlarged view showing that the motor in FIG. 1 is impacted by an external force so that the compressed springs therein are deformed by force.

Referring to FIG. 2, which is a schematic partial enlarged view showing that the motor 1 in FIG. 1 is impacted by an external force so that the compressed springs 16 therein are deformed by force. As shown in FIG. 2, when the bearing 13 and the shaft 10 of the motor 1 are subjected to an external force (e.g. subjected to shock or impact) along a first direction D1, the bearing 13 will move parallel to the axial line C of the shaft 10 (as the arrow A1 indicates in the drawing) and cause the compressed springs 16 to be deformed (i.e. compressed) and the head 10A of the shaft 10 to be separated from the abrasion-resistance piece 14.

Figure 3:
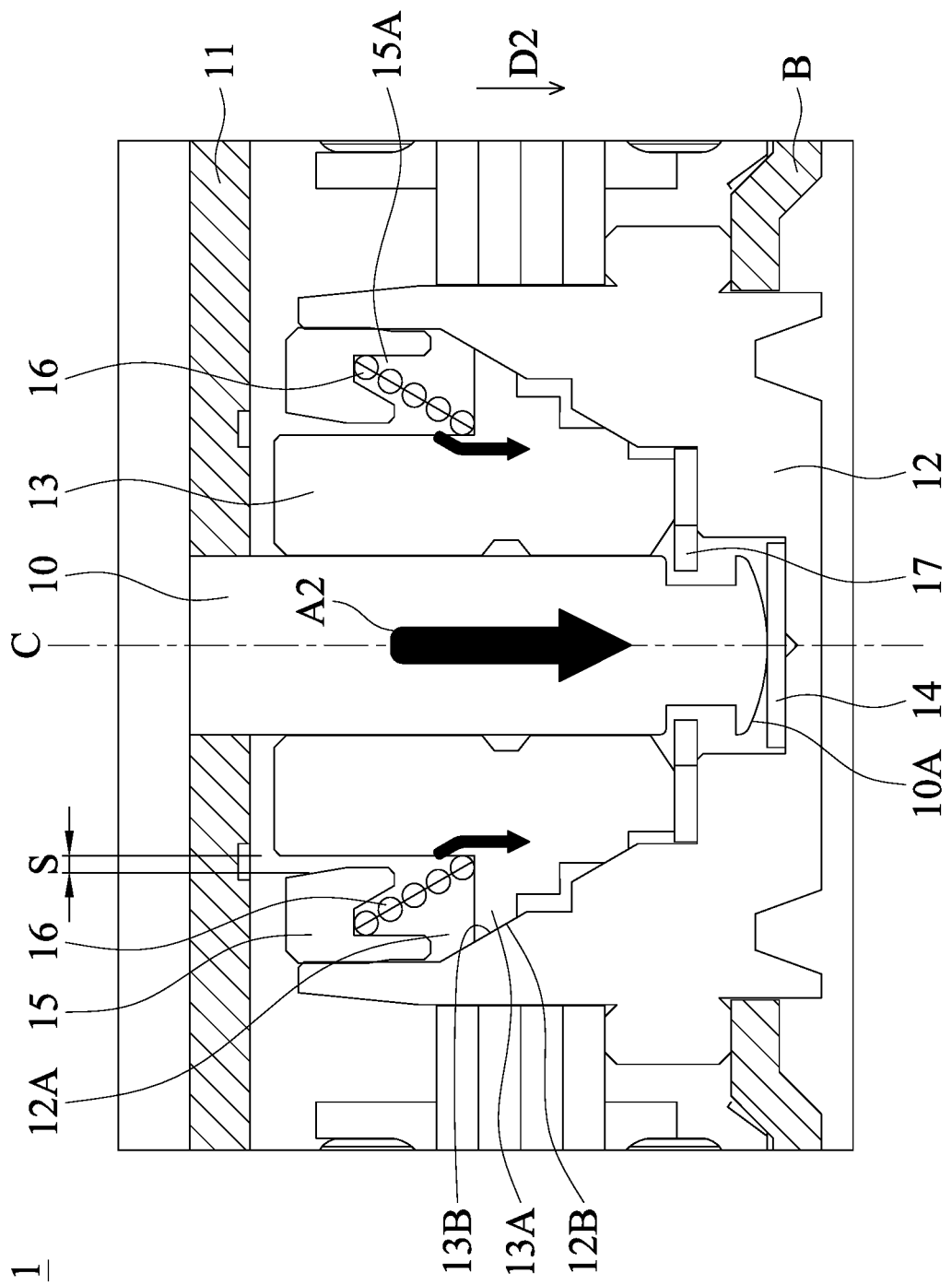
FIG. 3 is a schematic partial enlarged view showing that the compressed springs exert an elastic restoring force on the bearing to return it back to the original position.

Referring to FIG. 3, which is a schematic partial enlarged view showing that the compressed springs 16 exert an elastic restoring force on the bearing 13 to return it back to the original position. As shown in FIG. 3, after the external force (impact) disappears, the compressed springs 16 can exert an elastic restoring force along a second direction D2 (opposite to the first direction D1) on the bearing 13 to cause the bearing 13 and the shaft 10 return to their original positions (as the arrow A2 indicates in the drawing). It should be understood that the compressed springs 16 can absorb the force of the axial impact on the shaft 10, thereby preventing the abrasion-resistance piece 14 or the connected sleeve 12 from being damaged or deformed. As a result, the performance and the life of the motor and the fan can be maintained.

Figure 4:
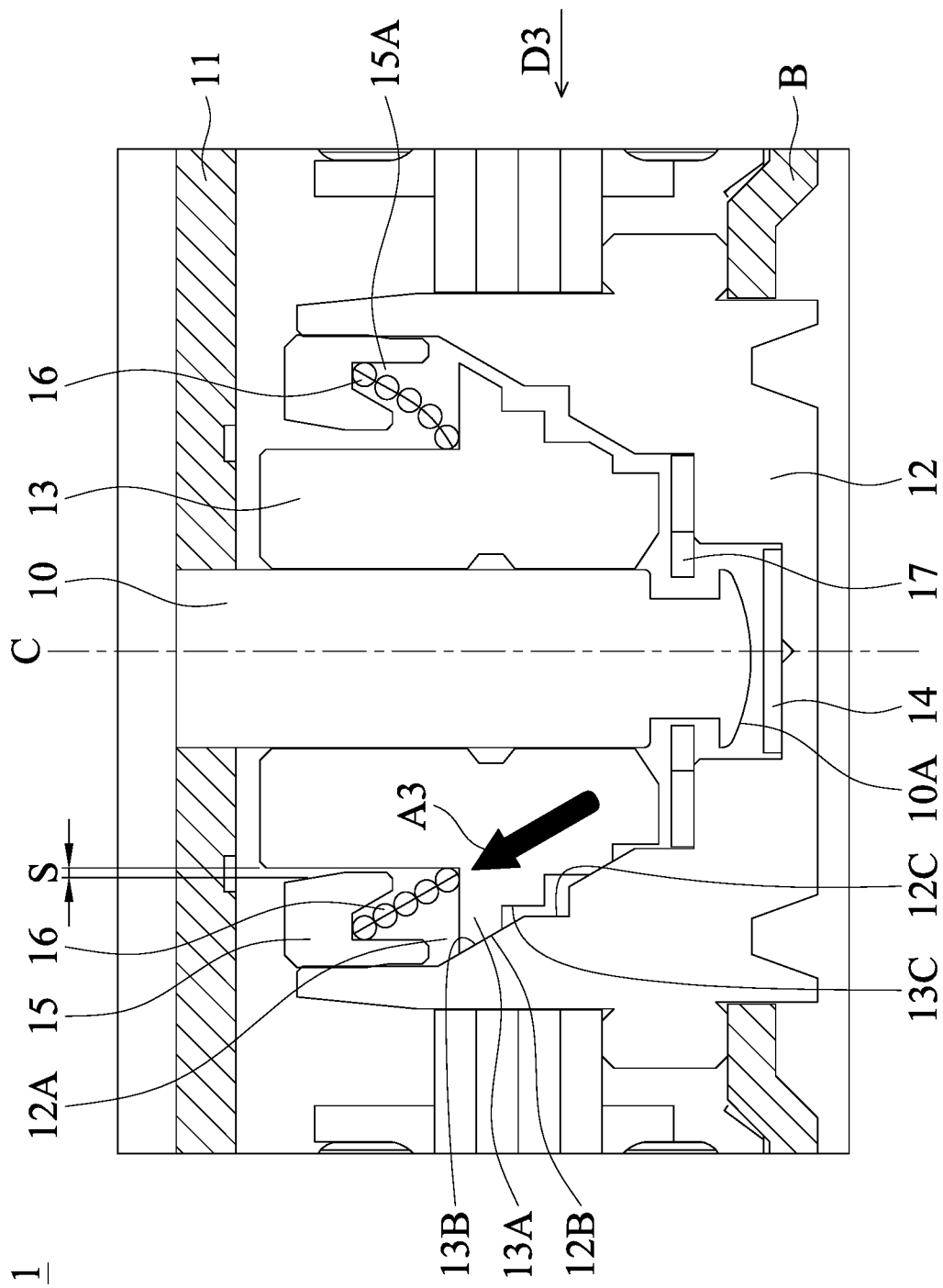
FIG. 4 is a schematic partial enlarged view showing that the motor in FIG. 1 is impacted by an external force so that the bearing slides with respect to the sleeve.

FIG. 4 is a schematic partial enlarged view showing that the motor 1 in FIG. 1 is impacted by an external force so that the bearing 13 slides with respect to the sleeve 12. As shown in FIG. 4, when the bearing 13 and the shaft 10 of the motor 1 are subjected to an external force (e.g. subjected to shock or impact) along a third direction D3 (different from the first and second directions D1 and D2), the second inclined surface 13B of the bearing 13 will slide with respect to the first inclined surface 12B of the accommodating space 12A of the sleeve 12 (as the arrow A3 indicates in the drawing) and cause the compressed springs 16 to be deformed (for example, some of the compressed springs 16 may be compressed while other some of the compressed springs 16 may be stretched) and the head 10A of the shaft 10 to be separated from the abrasion-resistance piece 14.

After the external force (impact) disappears, the compressed springs 16 can exert an elastic restoring force on the bearing 13 to return the bearing 13 and the shaft 10 back to their original positions. More specifically, the elastic restoring force of the compressed springs 16 can cause the bearing 13 and the shaft 10 therein to return to their original positions (i.e. return to the state shown in FIG. 1) along the first inclined surface 12B of the accommodating space 12A. In other words, as shown in FIG. 4, when the motor 1 of this embodiment is subjected to an impact along an oblique direction (i.e. not in the axial direction), some of the compressed springs 16 can absorb the force of the impact from displacement of the bearing 13 and cause it to quickly return to its original position.

It should also be realized that, when the rotor structure described above (including the shaft 10 and the connected rotor shell 11) is displaced, the magnetic biasing force generated by the rotor magnets RM and the stator magnets SM also returns the rotor structure back to its original position. At the same time, the bearing 13 provides the shaft 10 with a radial retention force during its movement, thereby maintaining the stable rotation of the shaft 10.

Referring to FIG. 4, a first limiting structure 12C may also be provided on the first inclined surface 12B of the accommodating space 12A of the sleeve 12, and a second limiting structure 13C may also be provided on the second inclined surface 13B of the bearing 13, wherein the position and shape of the second limiting structure 13C correspond to those of the first limiting structure 12C. Thus, the maximum sliding distance between the first inclined surface 12B and the second inclined surface 13B is limited by the first and second limiting structures 12C and 13C. For example, when the second inclined surface 13B of the bearing 13 slides a certain distance with respect to the first inclined surface 12B of the accommodating space 12A, the first and second limiting structures 12C and 13C can be engaged with each other so as to avoid over-displacement of the bearing 13 which may affect the stable operation of the motor 1.

Second Embodiment

Figure 5:
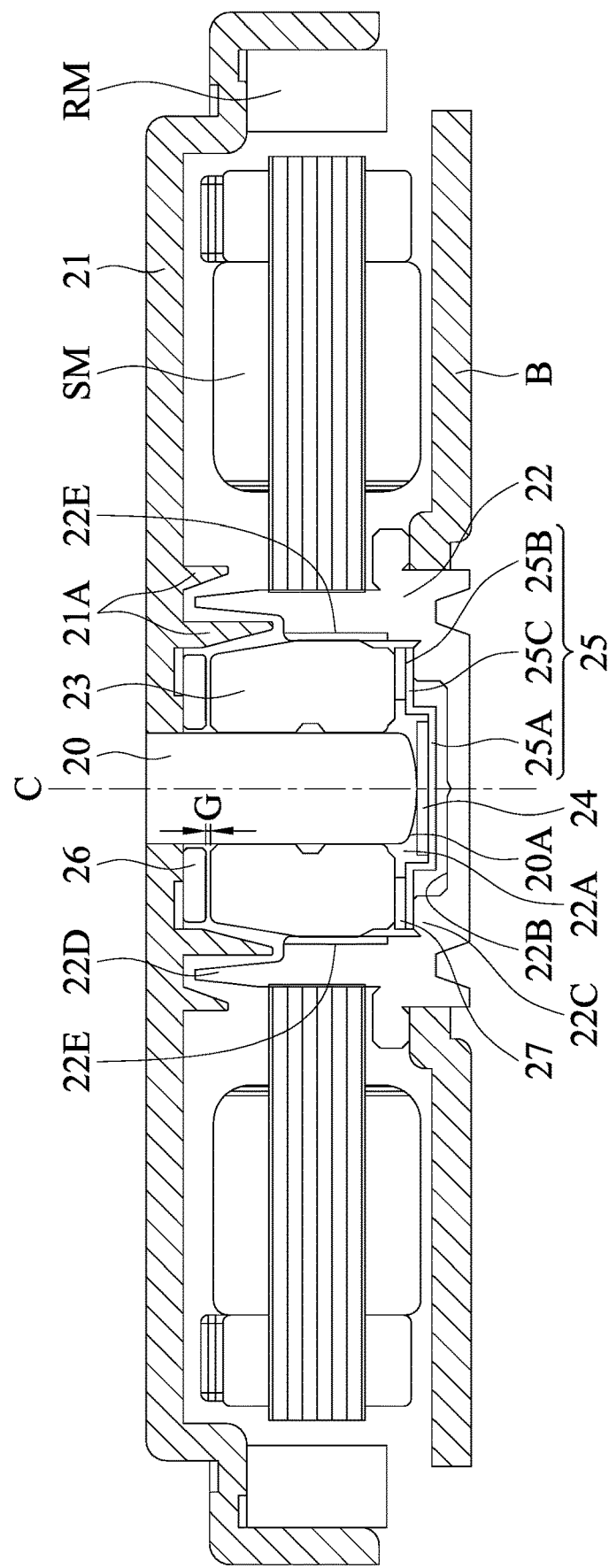
FIG. 5 is a schematic cross-sectional view of a motor in accordance with a second embodiment of the invention.

Referring to FIG. 5, a motor 2 in accordance with a second embodiment of the invention includes a shaft 20, a rotor shell 21, a sleeve 22, a bearing 23, an abrasion-resistance piece 24, an elastic member 25, and a thrust plate 26. It should be understood first that the shaft 20, rotor shell 21, and thrust plate 26 belong to a rotor structure, and the sleeve 22, bearing 23, abrasion-resistance piece 24, and elastic member 25 belong to a stator structure. The motor 2 also includes a base body B for supporting the stator structure described above, wherein the base body B and the sleeve 22 may be formed integrally as one piece or be two members that can be separated from each other.

The head of the shaft may be spherical or curved so as to enhance the performance and the life of the motor. For example, the head 20A of the shaft 20 is spherical in this embodiment, and the head 20A' of the shaft 20 is curved in the third embodiment.

The rotor shell 21 is connected to the shaft 20. In this embodiment, the rotor shell 21 and the shaft 20 can be connected by welding (e.g. laser welding), but the invention is not limited thereto. In some embodiments, the rotor shell 11 and the shaft 10 may also be connected by screw locking, interference fitting, or integrally forming. Moreover, several rotor magnets RM are mounted on the rotor shell 21 and correspond to the stator magnets SM on the base body B. It should be noted that one or more blades (not shown) may also be mounted on the rotor shell 21 so that the motor 2 can be used as a fan. The arrangement of the blades is a well-known art in this field and thus is not described here.

The sleeve 22 has an accommodating space 22A with the bearing 23 disposed therein, and the shaft 20 passes through the bearing 23. The accommodating space 22A may be filled with lubricating oil to assist the shaft 20 in rotation. The abrasion-resistance piece 24 is disposed at the bottom of the accommodating space 22A so that the head 20A of the shaft 20 can be rotated against the abrasion-resistance piece 24 and is not easy to wear. Thus, the life of the shaft 20 can be prolonged, thereby maintaining the performance and the life of the motor and the fan.

In this embodiment, the bottom portion and the ring portion of the sleeve 22 are integrally formed, but the invention is not limited thereto. In some embodiments (e.g. the motor of another embodiment shown in FIG. 10), the bottom portion of the sleeve may also be designed as a separable bottom cover.

In this embodiment, the bearing 23 may be an oil-retaining bearing, a hydrodynamic bearing, or a ceramic bearing, and its outer surface is connected to the wall of the accommodating space 22A of the sleeve 22 by interference fitting so that the bearing 23 can be affixed to the accommodating space 22A. Moreover, some hydrodynamic trench lines (not shown) are formed on the inner surface of the bearing 23 corresponding to the shaft 20 so as to hold the shaft 20 without contacting the inner surface of the bearing 23 (i.e. the bearing 23 provides the shaft 20 with a radial retention force) due to the hydrodynamic pressure generated by the lubricating oil. As a result, the life of the shaft 20 and the bearing 23 can be prolonged, thereby maintaining the performance and the life of the motor and the fan. Furthermore, the hydrodynamic trench lines may be changed in accordance with the forward and reverse directions of the motor 2 and are thus not limited here. The design of the hydrodynamic trench lines is a well-known art in this field and thus is not described here.

Figure 6B:
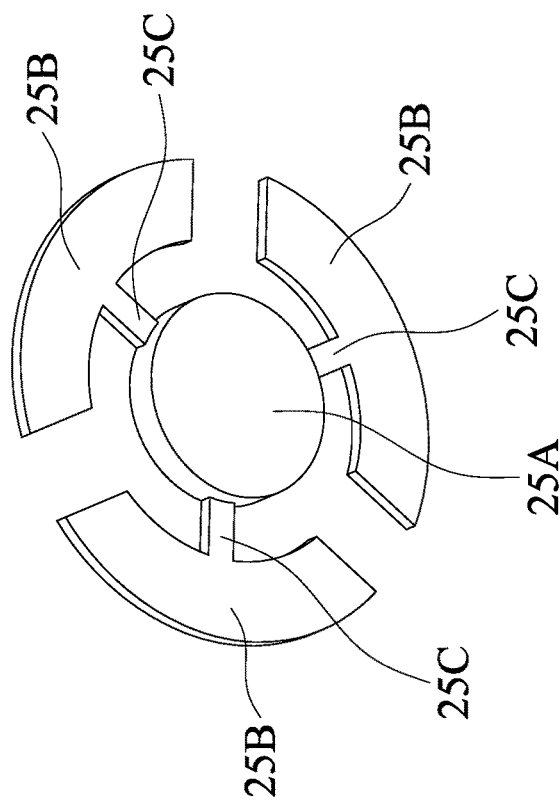
FIGS. 6A and 6B are schematic perspective views of the elastic member in FIG. 5 from different viewing angles.
Figure 6A:
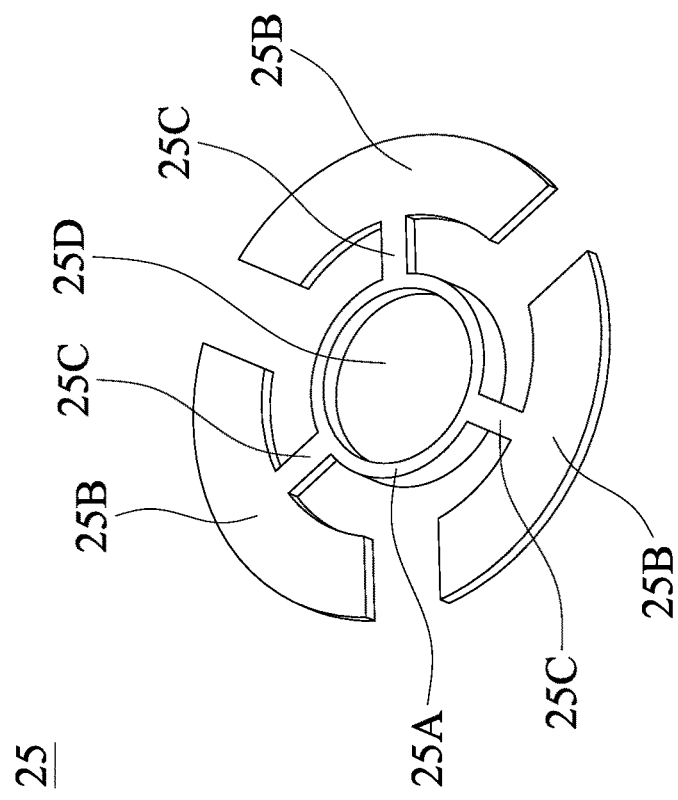

The elastic member 25 is disposed at the bottom of the accommodating space 22A of the sleeve 22, and the abrasion-resistance piece 24 is disposed on the elastic member 25 (i.e. situated between the elastic member 25 and the head 20A of the shaft 20). Referring to FIGS. 5, 6A, and 6B, wherein FIGS. 6A and 6B are schematic perspective views of the elastic member 25 in FIG. 5 from different viewing angles. In this embodiment, the elastic member 25 is a spring leaf made of an elastic material (e.g. metal), including a disk part 25A, several outer ring parts 25B, and several connecting parts 25C. The disk part 25A is formed with a depressed accommodating space 25D that is used to receive the abrasion-resistance piece 24 (as shown in FIG. 5). The outer ring parts 25B are provided the disk part 25A and separated from each other. The connecting parts 25C are used to connect the disk part 25A and the outer ring parts 25B. It should be understood that the number of outer ring parts 25B and connecting parts 25C can be changed according to need and is not limited to the embodiment shown in FIGS. 6A and 6B.

As shown in FIG. 5, in this embodiment, the bottom of the accommodating space 22A of the sleeve 22 forms a recess 22B and a protrusion 22C surrounding the recess 22B. When the elastic member 25 is placed in the accommodating space 22A, the disk part 25A is correspondingly placed in the recess 22B and separated from the bottom surface of the recess 22B by a distance, and the outer ring parts 25B are affixed to the protrusion 22C. The center of the disk part 25A corresponds to the axial line C of the shaft 20.

The motor 2 of this embodiment also includes a spacer 27. The spacer 27 is provided between the outer ring parts 25B of the elastic member 25 on the protrusion 22C and the bearing 23 for preventing the elastic member 25 and the bearing 30 from contacting each other and being worn. Moreover, after the bearing 23 is placed in the accommodating space 22A of the sleeve 22, the bearing 23 presses on the elastic member 25 through the spacer 27 so that the elastic member 25 is secured at the bottom of the accommodating space 22A.

The thrust plate 26 is connected to the shaft 20 and is provided on an end portion of the shaft 20 adjacent to the rotor shell 21. In this embodiment, the shaft 20 passes through the thrust plate 26. The thrust plate 26 rotates with the shaft 20 and is also axially displaceable with the shaft 20. In some embodiments, the thrust plate 26 and the shaft 20 may be connected by interference fitting, welding (e.g. laser welding), or adhesive bonding. Alternatively, the thrust plate 26 and the shaft 20 may be formed integrally. The material of the thrust plate 26 comprises, for example, but not limited to, a porous material, copper, an alloy, or a ceramic, and the thrust plate 26 can be made by die-casting, turning, or metal powder injection molding etc.

Figure 7:
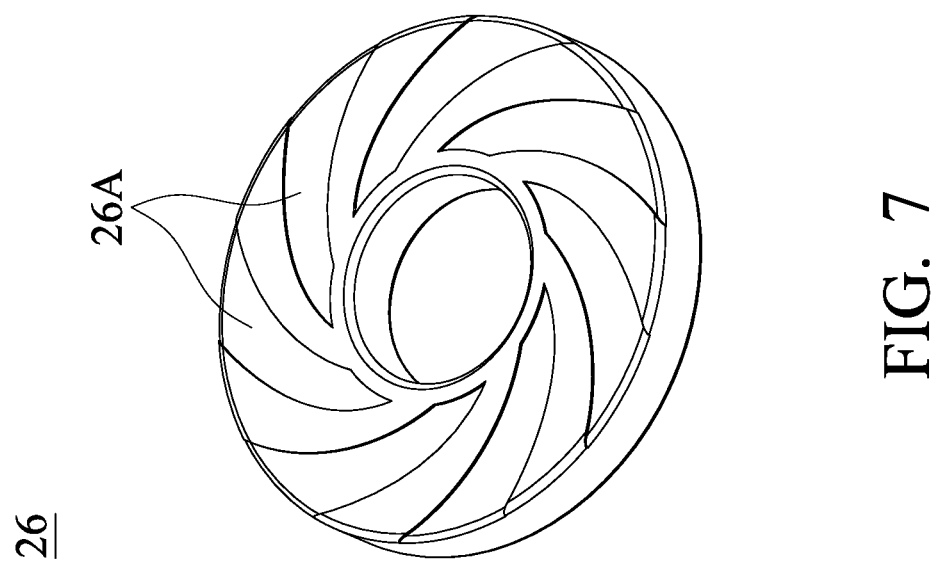
FIG. 7 is a schematic perspective view of the thrust plate in FIG. 5.

Several grooves 26A that are width-reduced from the outward to the center are formed on at least one surface of the thrust plate 26. Referring to FIGS. 5 and 7, wherein FIG. 7 is a schematic perspective view of the thrust plate 26 in FIG. 5. In this embodiment, the grooves 26A are formed on a surface of the thrust plate 26 facing the bearing 23, and the grooves 26A are radially curved and can be designed according to the forward and reverse directions of the motor 2. When the motor 2 operates normally, a gap G is provided between the thrust plate 26 and the bearing 23. Moreover, when the motor 2 is subjected to shock or impact during operation and the rotor structure starts to become axially displaced, the thrust plate 26 may move axially toward the bearing 23 such that the gap G becomes small. At this time, as the thrust plate 26 rotates with the shaft 20, the lubricating oil gradually becomes rigid owing to the increase of the pressure of the gap G caused by the grooves 26A, and the rigidity of the lubricating oil is extremely great when the gap G is very small. On the other hand, the rigidity of the lubricating oil (caused by the thrust plate 26) may gradually disappear when the rotor structure is pushed back to its original position.

With the above structural design, when the motor 2 is not subjected to shock or impact, the bearing 23 provides the shaft 20 with a radial retention force and the elastic member 25 provides the shaft 20 with an axial supporting force so that the shaft 20 can rotate stably in the normal position. Moreover, in this state, the thrust plate 26 and the bearing 23 therebetween do not generate thrust in the axial direction due to the gap G.

Figure 8:
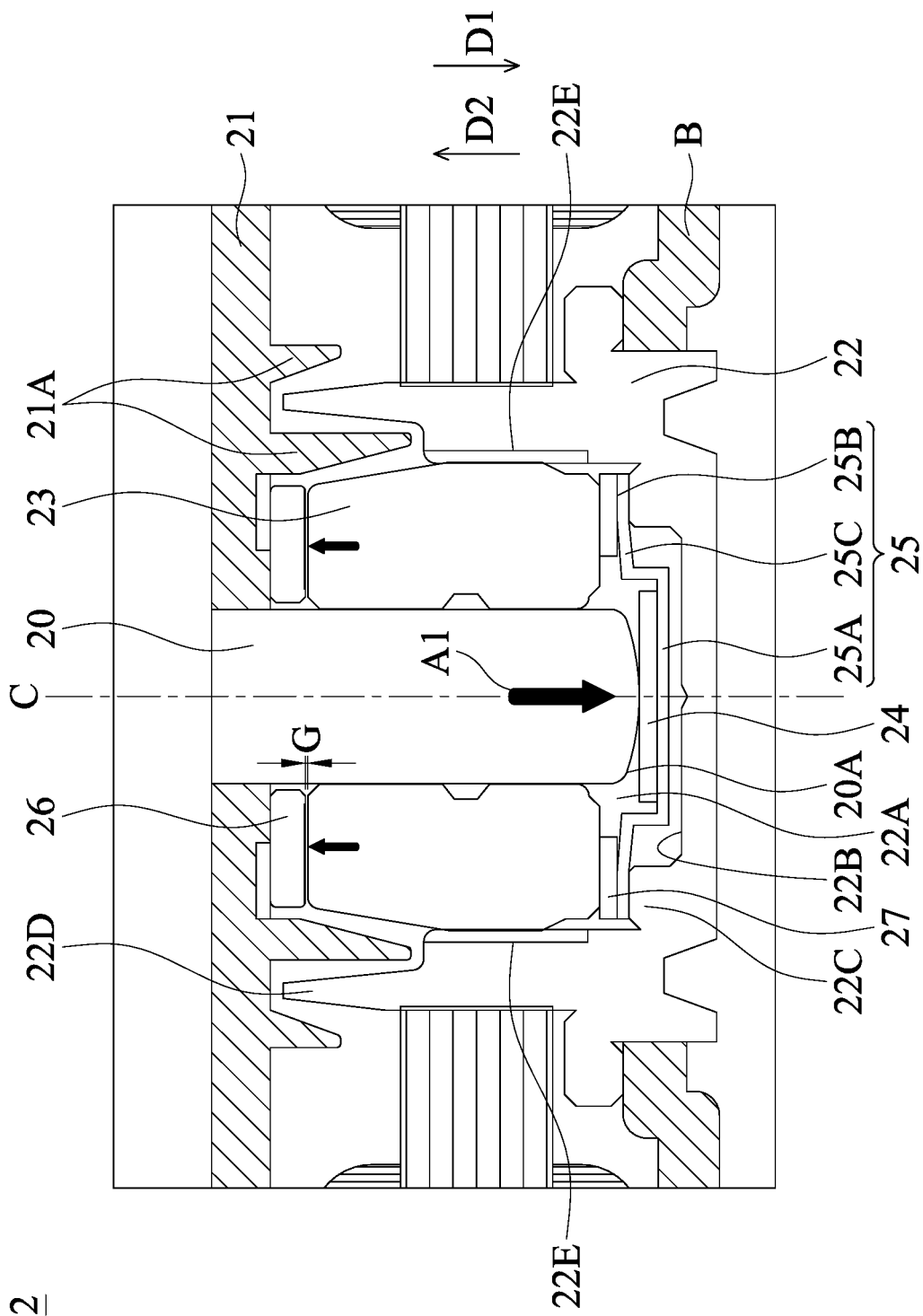
FIG. 8 is a schematic partial enlarged view showing that the motor in FIG. 5 is impacted by an external force so that the elastic member therein is deformed by force.

Referring to FIG. 8, which is a schematic partial enlarged view showing that the motor 2 in FIG. 5 is impacted by an external force so that the elastic member 25 therein is deformed by force. As shown in FIG. 8, when the shaft 20 of the motor 2 is subjected to an external force (e.g. subjected to shock or impact) along a first direction D1, the shaft 20 will move parallel to the axial line C thereof (as the arrow A1 indicates in the drawing) and push the abrasion-resistance piece 24. At this time, the elastic member 25 is deformed by force. In this embodiment, when the abrasion-resistance piece 24 is pushed by the shaft 20 along the first direction D1, the connecting parts 25C of the elastic member 25 are deformed (i.e. bent) by force and the disk part 25A of the elastic member 25 will move toward the bottom surface of the recess 22B.

Moreover, when the shaft 20 moves along the first direction D1, the gap G between the thrust plate 26 and the bearing 23 becomes small. At this time, the lubricating oil gradually becomes rigid owing to the increase of the pressure of the gap G caused by the grooves 26A on the thrust plate 26, and a thrust (force) which pushes the shaft 20 toward a second direction D2 opposite to the first direction D1 is generated. Thus, the thrust generated between the thrust plate 26 and the bearing 23 can offset a part of the above external force (impact) along the first direction D1 so that the degree of deformation of the elastic member 25 is reduced (i.e. the displacement of the shaft 20 in the axial direction is reduced), thereby facilitating extension of the life of the elastic member 25.

Figure 9:
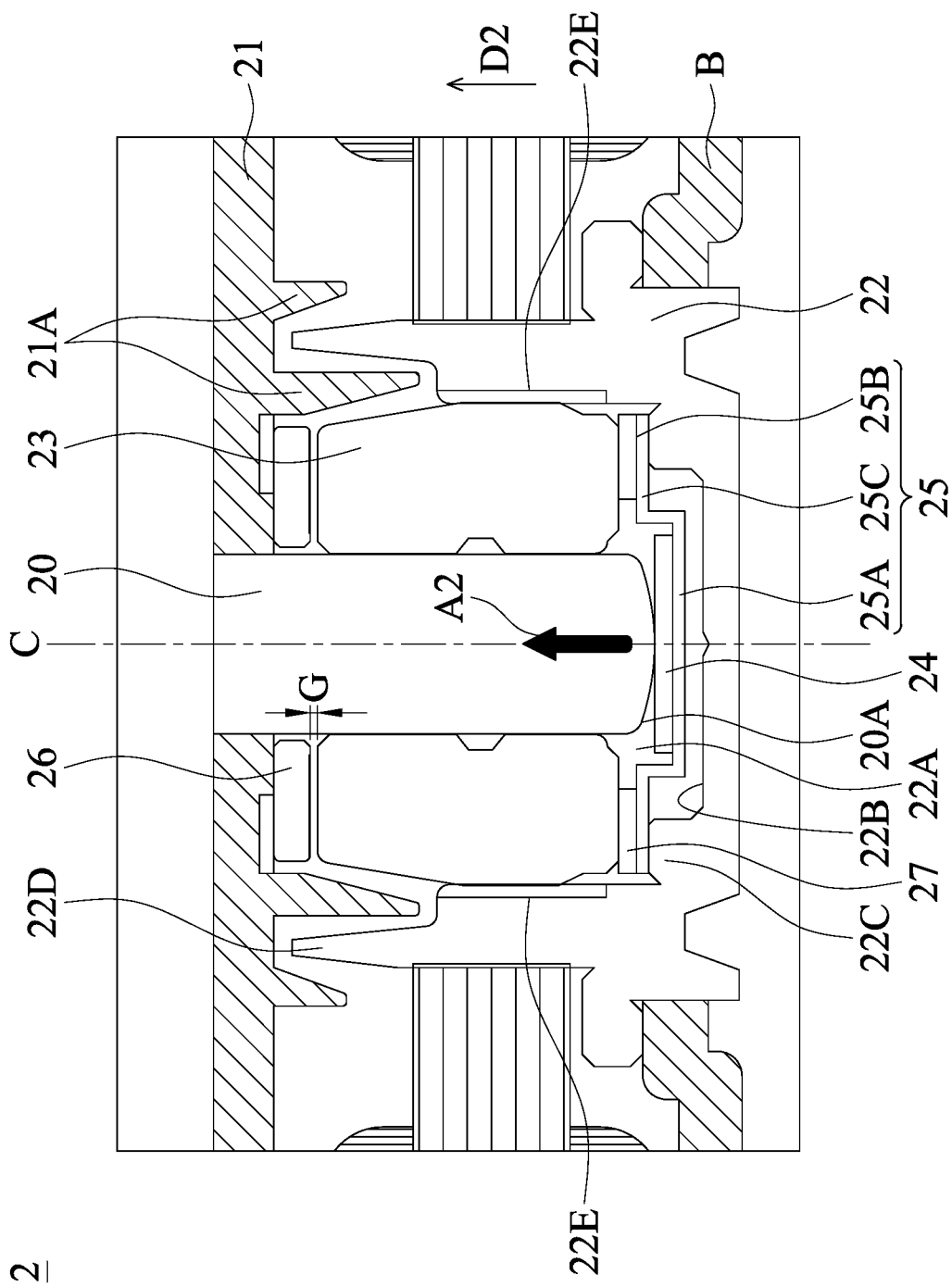
FIG. 9 is a schematic partial enlarged view showing that the elastic member exerts an elastic restoring force on the shaft to return it back to the original position.

Referring to FIG. 9, which is a schematic partial enlarged view showing that the elastic member 25 exerts an elastic restoring force on the shaft 20 to return it back to the original position. As shown in FIG. 9, after the external force (impact) disappears, the elastic member 25 can exert an elastic restoring force along a second direction D2 on the shaft 20 to return it back to the original position (as the arrow A2 indicates in the drawing). It should be understood that the elastic member 25 can absorb the force of the axial impact on the shaft 20, thereby preventing the abrasion-resistance piece 24 from being damaged or deformed. As a result, the performance and the life of the motor and the fan can be maintained.

In particular, when the shaft 20 moves to its original position along the second direction D2, the thrust generated between the thrust plate 26 and the bearing 23 is in the same direction (the second direction D2) as the elastic restoring force of the elastic member 25 and is mainly used to prevent the shaft 20 from moving obliquely (i.e. to prevent the shaft 20 from being tilted). Therefore, the thrust (i.e. a face auxiliary force) generated between the thrust plate 26 and the bearing 23 can assist the elastic restoring force of the elastic member 25 to cause the shaft 20 to accurately return to its original position. In this embodiment, the magnitude of the thrust generated between the thrust plate 26 and the bearing 23 is inversely proportional to the size of the gap G between the thrust plate 26 and the bearing 23.

It should also be realized that, when the rotor structure described above (including the shaft 20 and the connected rotor shell 21) is displaced, the magnetic biasing force generated by the rotor magnets RM and the stator magnets SM also returns the rotor structure back to its original position. At the same time, the bearing 23 continuously provides the shaft 20 with a radial retention force, thereby maintaining the stable rotation of the shaft 20.

Referring to FIG. 5, in this embodiment, the rotor shell 21 also has several protruding structures 21A extending from the rotor shell 21 toward the direction of the sleeve 22, and the protruding structures 21A and the top 22D of the sleeve 22 form a comb structure, thereby preventing the lubricating oil stored in the accommodating space 22A of the sleeve 22 from leaking. Consequently, the performance and the life of the motor and the fan can be maintained.

In this embodiment, one or more exhaust channels 22E are formed on the sleeve 22 for successfully exhausting the gas that is generated from the waste heat caused by the rising temperature of the lubricating oil out of the sleeve 22 through the exhaust channels 22E.

Furthermore, in some embodiments, in order to reduce the height of the motor and the fan, the thrust plate 26 may also be omitted and the grooves 26A are formed directly on the upper surface of the bearing 23 or the inner surface of the rotor shell 21 so as to still limit the axial and oblique movement of the shaft 20.

Third Embodiment

Figure 10:
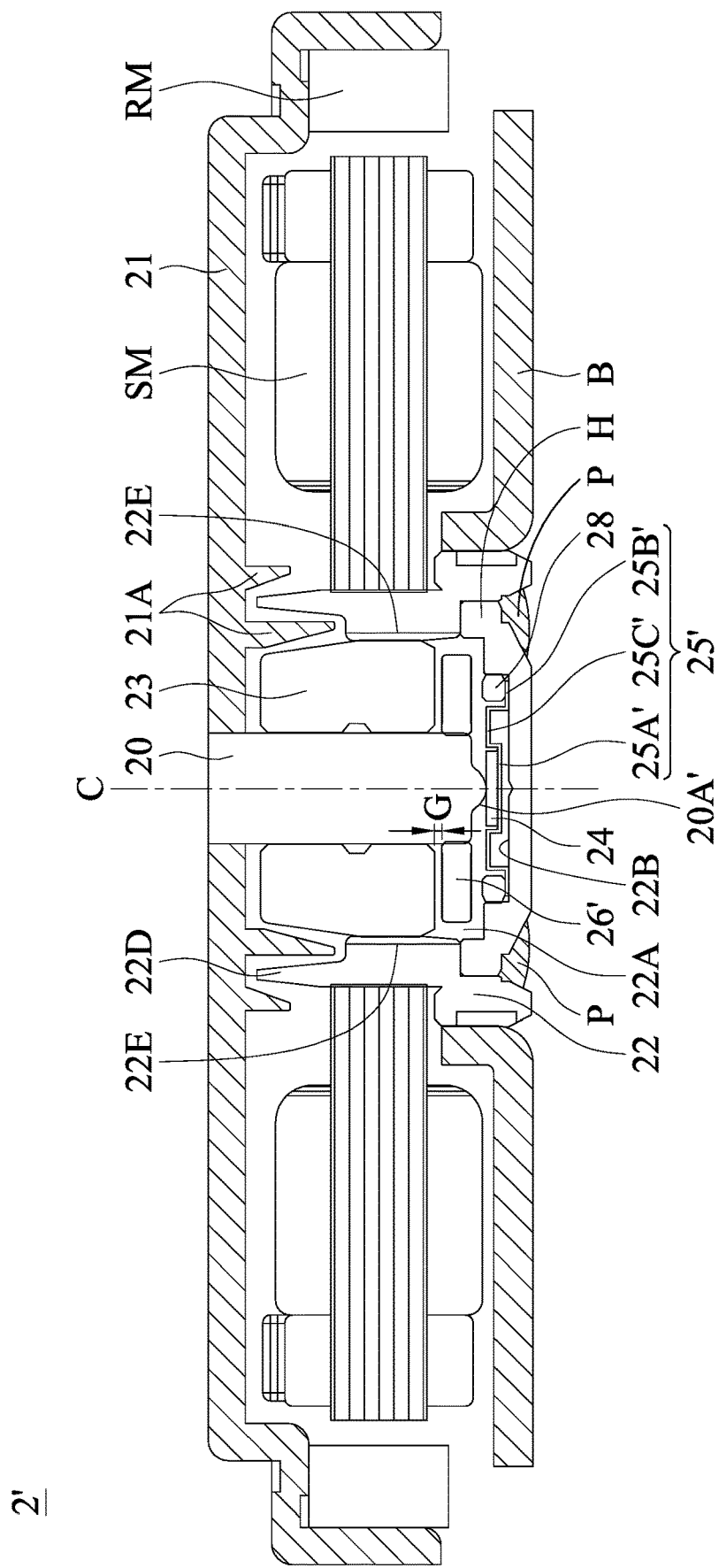
FIG. 10 is a schematic cross-sectional view of a motor in accordance with a third embodiment of the invention.

Referring to FIG. 10, a motor 2' in accordance with a third embodiment of the invention includes a shaft 20, a rotor shell 21, a sleeve 22, a bearing 23, an abrasion-resistance piece 24, an elastic member 25', and a thrust plate 26'. It should be understood first that the above components of this embodiment are designated by the similar reference numerals as those of the second embodiment, and the configuration and arrangement of the shaft 20, rotor shell 21, bearing 23, and the abrasion-resistance piece 24 are also the same as those of the second embodiment and thus are not repeated here. The following paragraphs illustrate only the differences between the present embodiment and the second embodiment.

As shown in FIG. 10, in this embodiment, the bottom portion of the sleeve 22 is designed as a separable bottom cover H. In order to prevent lubricating oil from leaking from gaps between the bottom cover H and the sleeve 22, some sealants P may be applied to the gaps.

Moreover, a recess 22B is formed on the inner surface of the bottom cover H (i.e. the bottom of the accommodating space 22A of the sleeve 22). The elastic member 25' is correspondingly placed in the recess 22B, and the disk part 25A' thereof is separated from the bottom surface of the recess 22B by a distance. In this embodiment, the entire elastic member 25' is provided in the recess 22B, and the outer ring parts 25B' thereof are pressed by a pressure ring 28 which is a ring structure so that the elastic member 25' is secured in the recess 22B.

As shown in FIG. 10, the thrust plate 26' is connected to the shaft 20 and is provided on a (distal) end portion of the shaft 20 adjacent to the elastic member 25'. In this embodiment, the shaft 20 passes through the thrust plate 26'. The thrust plate 26' rotates with the shaft 20 and is also axially displaceable with the shaft 20. The optional connection of the thrust plate 26' to the shaft 20 has been described in the second embodiment and is thus not repeated here. It should be noted that when the thrust plate 26' is provided on the distal end portion of the shaft 20, the life of the bearing 23 can be increased.

In this embodiment, several grooves 26A (as shown in FIG. 7) that are width-reduced from the outward to the center are formed on a surface of the thrust plate 26' facing the bearing 23. Similar to the second embodiment, when the motor 2' operates normally, a gap G is provided between the thrust plate 26' and the bearing 23. Moreover, when the motor 2' is subjected to shock or impact during operation and the rotor structure starts to become axially displaced, the thrust plate 26' may move axially toward the bearing 23 causing the gap G to become small. At this time, as the thrust plate 26' rotates with the shaft 20, the lubricating oil gradually becomes rigid owing to the increase of the pressure of the gap G caused by the grooves 26A, and the rigidity of the lubricating oil is extremely great when the gap G is very small. On the other hand, the rigidity of the lubricating oil (caused by the thrust plate 26') may gradually disappear when the rotor structure is pushed back to its original position.

With the above structural design, when the motor 2' is not subjected to shock or impact, the bearing 23 provides the shaft 20 with a radial retention force and the elastic member 25' provides the shaft 20 with an axial supporting force so that the shaft 20 can rotate stably in the normal position. Moreover, in this state, the thrust plate 26' and the bearing 23 therebetween do not generate thrust in the axial direction due to the gap G.

Figure 11:
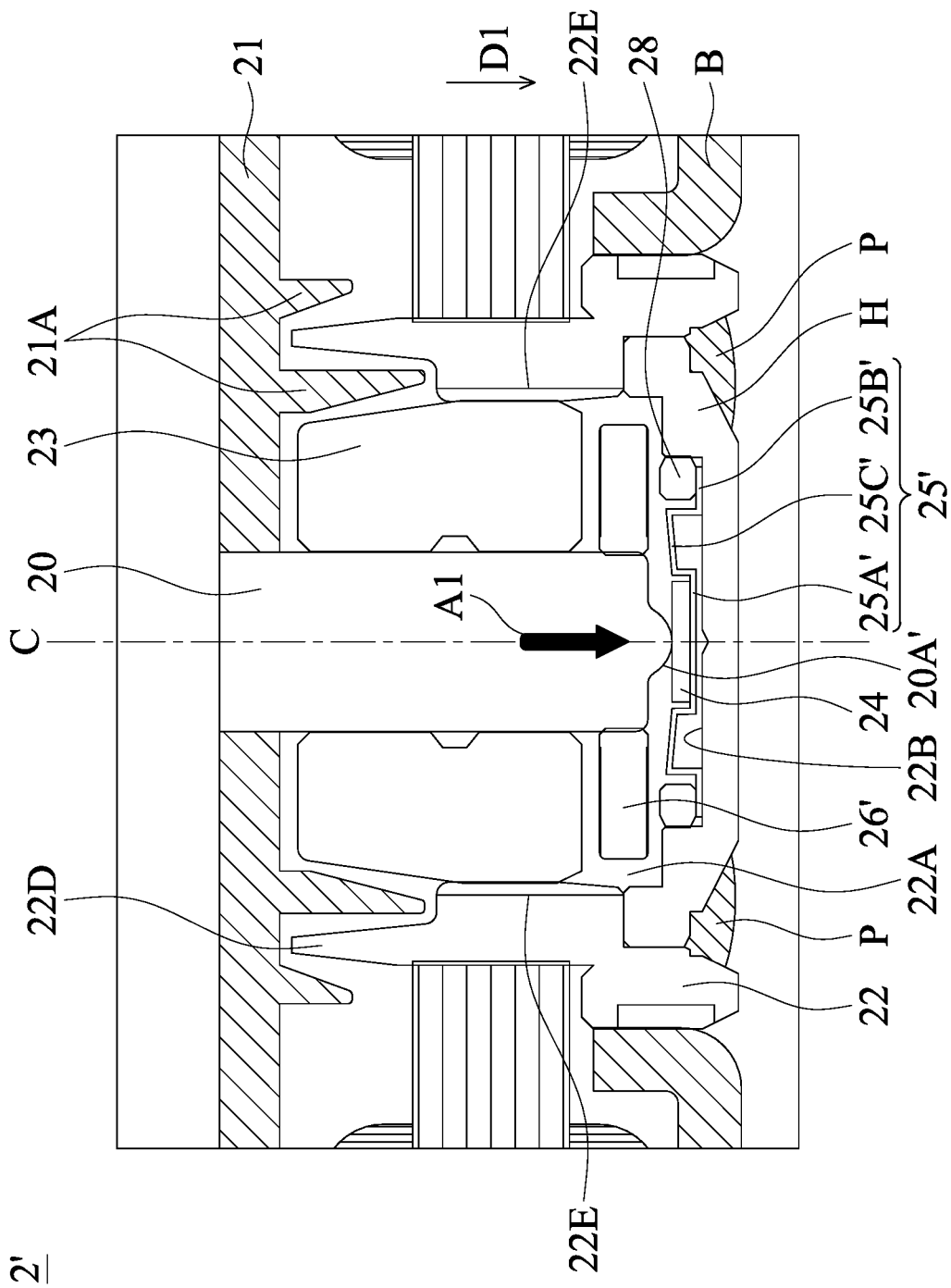
FIG. 11 is a schematic partial enlarged view showing that the motor in FIG. 10 is impacted by an external force so that the elastic member therein is deformed by force.

Referring to FIG. 11, which is a schematic partial enlarged view showing that the motor 2' in FIG. 10 is impacted by an external force so that the elastic member 25' therein is deformed by force. As shown in FIG. 11, when the shaft 20 of the motor 2' is subjected to an external force (e.g. subjected to shock or impact) along a first direction D1, the shaft 20 will move parallel to the axial line C thereof (as the arrow A1 indicates in the drawing) and push the abrasion-resistance piece 24. At this time, the elastic member 25' is deformed by force. In this embodiment, when the abrasion-resistance piece 24 is pushed by the shaft 20 along the first direction D1, the connecting parts 25C' of the elastic member 25' are deformed (i.e. bent) by force and the disk part 25A' of the elastic member 25' will move toward the bottom surface of the recess 22B. It should be noted that when the shaft 20 moves along the first direction D1, the gap G between the thrust plate 26' and the bearing 23 becomes large and thus there is no thrust in the axial direction between them being generated.

Figure 12:
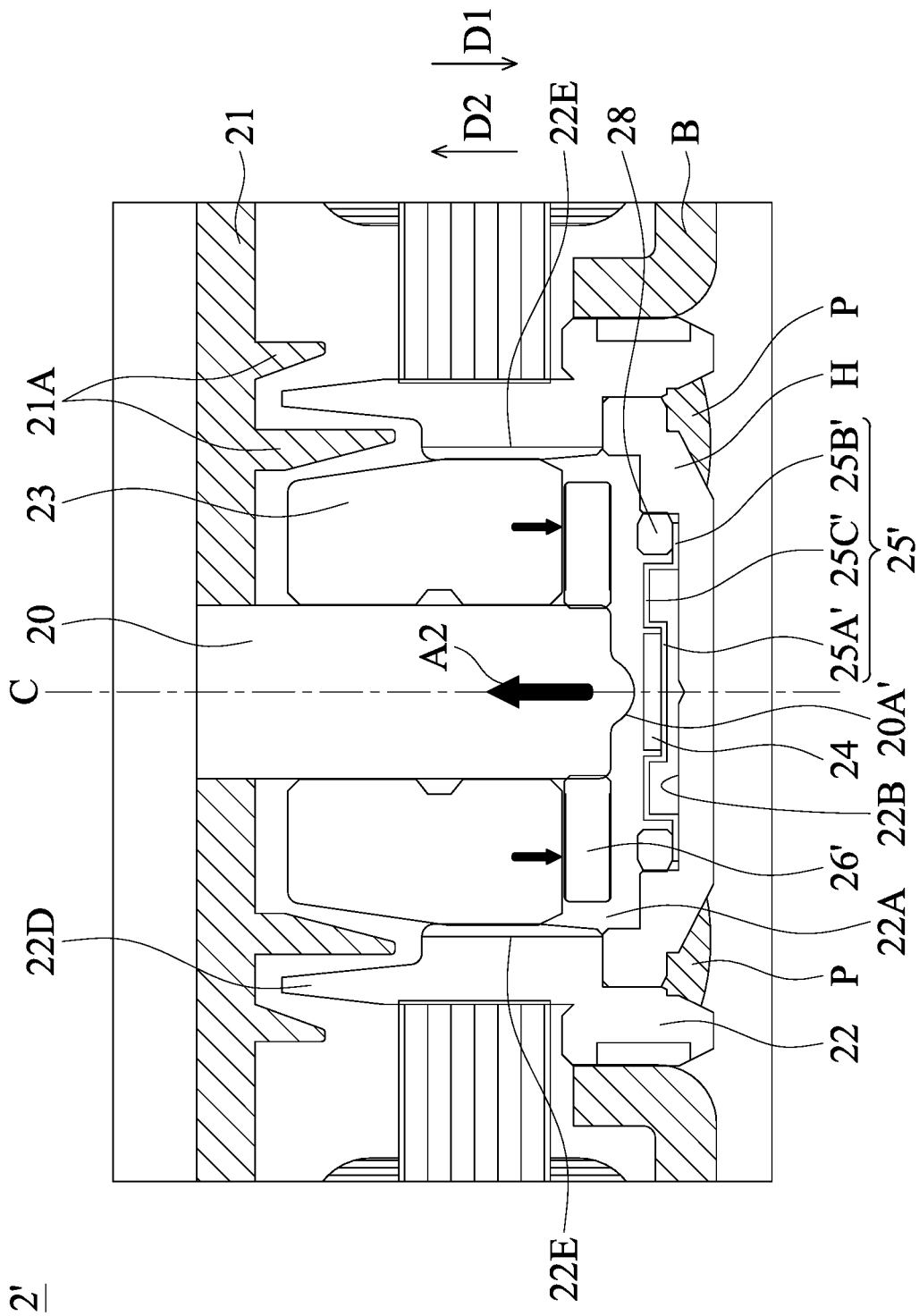
FIG. 12 is a schematic partial enlarged view showing that the elastic member exerts an elastic restoring force on the shaft, and a face auxiliary force is generated between the thrust plate and the bearing to assist the elastic restoring force, to return the shaft back to its original position.

Referring to FIG. 12, which is a schematic partial enlarged view showing that the elastic member 25' exerts an elastic restoring force on the shaft 20, and a face auxiliary force is generated between the thrust plate 26' and the bearing 23 to assist the elastic restoring force, to return the shaft 20 back to its original position. As shown in FIG. 12, after the external force (impact) disappears, the elastic member 25' can exert an elastic restoring force along a second direction D2 (opposite to the first direction D1) on the shaft 20 to return it back to the original position (as the arrow A2 indicates in the drawing). It should be understood that the elastic member 25' can absorb the force of the axial impact on the shaft 20, thereby preventing the abrasion-resistance piece 24 from being damaged or deformed. As a result, the performance and the life of the motor and the fan can be maintained.

In particular, when the shaft 20 moves along the second direction D2 and the gap G between the thrust plate 26' and the bearing 23 becomes small (i.e. when the elastic restoring force of the elastic member 25' causes the shaft 20 to move along the second direction D2 and beyond its original position), the lubricating oil gradually becomes rigid owing to the increase of the pressure of the gap G caused by the grooves 26A on the thrust plate 26', and a thrust (force) which pushes the shaft 20 toward the first direction D1 opposite to the second direction D2 (i.e. the thrust is in the reverse direction with respect to the elastic restoring force of the elastic member 25') is generated. Thus, the thrust can prevent the thrust plate 26' from contacting the bearing 23 and return the shaft 20 back to its original position. Accordingly, the thrust (i.e. a face auxiliary force) generated between the thrust plate 26' and the bearing 23 can assist the elastic restoring force of the elastic member 25' to cause the shaft 20 to accurately return to its original position. In this embodiment, the magnitude of the thrust generated between the thrust plate 26' and the bearing 23 is inversely proportional to the size of the gap G between the thrust plate 26' and the bearing 23. In addition, the thrust generated between the thrust plate 26' and the bearing 23 may also be used to prevent the shaft 20 from moving obliquely (i.e. to prevent the shaft 20 from being tilted).

It should also be realized that, when the rotor structure described above (including the shaft 20 and the connected rotor shell 21) is displaced, the magnetic biasing force generated by the rotor magnets RM and the stator magnets SM also returns the rotor structure back to its original position. At the same time, the bearing 23 continuously provides the shaft 20 with a radial retention force, thereby maintaining the stable rotation of the shaft 20.

As mentioned above, the invention provides various embodiments of a motor with shock-proof design (e.g. the compressed springs 16 in the first embodiment and the elastic member 25' and the thrust plate 26/26' in the second and third embodiments) which can effectively absorb the shock or impact energy so as to reduce the chance of damage occurring to the shaft, bearing, abrasion-resistance piece, and other components in the motor, thereby maintaining the stable operation and life of the motor and the fan.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A motor, comprising:
   a shaft, having a head;
   a rotor shell, connected to the shaft;
   a sleeve, having an accommodating space;
   an elastic member, disposed at a bottom of the accommodating space;
   an abrasion-resistance piece, disposed on the elastic member and situated between the elastic member and the head of the shaft;
   a bearing, disposed in the accommodating space, wherein the shaft passes through the bearing and abuts the abrasion-resistance piece; and
   a thrust plate, connected to the shaft and provided on an end portion of the shaft adjacent to the elastic member,
   wherein the elastic member has a disk part and the abrasion-resistance piece is received in the disk part.

2. The motor as claimed in claim 1, wherein when the shaft is subjected to an external force along a first direction to move and push the abrasion-resistance piece, the elastic member is deformed by force and exerts an elastic restoring force along a second direction on the shaft, and a face auxiliary force is generated between the thrust plate and the bearing to assist the elastic restoring force and to return the shaft back to its original position, wherein the second direction is opposite to the first direction.

3. The motor as claimed in claim 2, wherein the face auxiliary force generated between the thrust plate and the bearing is in a reverse direction with respect to the elastic restoring force of the elastic member, and a magnitude of the face auxiliary force is inversely proportional to a size of a gap between the thrust plate and the bearing.

4. The motor as claimed in claim 2, wherein the face auxiliary force generated between the thrust plate and the bearing is used to prevent the shaft from moving obliquely.

5. The motor as claimed in claim 1, wherein the thrust plate comprises a plurality of grooves that are width-reduced from an outward to a center, and the plurality of grooves are formed on a surface of the thrust plate facing the bearing.

6. The motor as claimed in claim 1, wherein the elastic member has a plurality of outer ring parts surrounding the disk part and a plurality of connecting parts connecting the disk part and the plurality of outer ring parts.

7. The motor as claimed in claim 6, wherein the bottom of the accommodating space forms a recess, and the elastic member is placed in the recess, and the disk part is separated from a bottom surface of the recess by a distance.

8. The motor as claimed in claim 7, further comprising a pressure ring for securing the elastic member in the recess.

9. The motor as claimed in claim 1, wherein the rotor shell has a plurality of protruding structures extending from the rotor shell toward a direction of the sleeve, and the plurality of protruding structures and a top of the sleeve form a comb structure so as to prevent lubricating oil stored in the accommodating space of the sleeve from leaking.

10. The motor as claimed in claim 1, wherein at least one exhaust channel is formed on the sleeve.

11. The motor as claimed in claim 1, wherein the sleeve is an oil-retaining bearing.

12. The motor as claimed in claim 1, further comprising a base body, wherein the base body and the sleeve are formed integrally as one piece or are two members that can be separated from each other.

13. A motor, comprising:
    a shaft, having a head;
    a rotor shell, connected to the shaft;
    a sleeve, having an accommodating space;
    an elastic member, disposed at a bottom of the accommodating space;
    an abrasion-resistance piece, disposed on the elastic member and between the elastic member and the head of the shaft;
    a bearing, disposed in the accommodating space, wherein the shaft passes through the bearing and abuts the abrasion-resistance piece; and
    a pressure ring, for securing the elastic member.

14. The motor as claimed on claim 13, wherein the elastic member has a disk part, a plurality of outer ring parts surrounding the disk part, and a plurality of connecting parts connecting the disk part and the plurality of outer ring parts, wherein the abrasion-resistance piece is received in the disk part.

15. The motor as claimed in claim 14, wherein the bottom of the accommodating space forms a recess, and the elastic member is placed in the recess, and the disk part is separated from a bottom surface of the recess by a distance.

16. The motor as claimed on claim 15, wherein the pressure ring is for securing the elastic member in the recess.

17. The motor as claimed in claim 13, further comprising a thrust plate connected to the shaft and adjacent to the elastic member.

18. The motor as claimed in claim 17, wherein the thrust plate comprises a plurality of grooves on a surface of the thrust plate facing the bearing.

19. A motor, comprising:
    a shaft, having a head;
    a rotor shell, connected to the shaft;
    a sleeve, having an accommodating space;
    a bearing, disposed in the accommodating space, wherein the shaft passes through the bearing; and
    a thrust plate, connected to the shaft and provided on an end portion of the shaft,
    wherein the rotor shell has a plurality of protruding structures extending from the rotor shell toward a direction of the sleeve, and the plurality of protruding structures and a top of the sleeve form a comb structure so as to prevent lubricating oil stored in the accommodating space of the sleeve from leaking.

20. The motor as claimed in claim 19, further comprising an elastic member disposed at a bottom of the accommodating space and an abrasion-resistance piece disposed on the elastic member, wherein the shaft abuts the abrasion-resistance piece.

* * * * *